(12) United States Patent
Sekihara

(10) Patent No.: US 6,969,128 B2
(45) Date of Patent: Nov. 29, 2005

(54) HYDRAULIC BRAKE DEVICE

(75) Inventor: Yasuhito Sekihara, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/689,044

(22) Filed: Oct. 21, 2003

(65) Prior Publication Data
US 2004/0113488 A1 Jun. 17, 2004

(30) Foreign Application Priority Data
Oct. 29, 2002 (JP) ............................. 2002-314536
Aug. 29, 2003 (JP) ............................. 2003-305841

(51) Int. Cl.[7] .............................................. B60T 8/32
(52) U.S. Cl. ............................. 303/113.1; 303/DIG. 10
(58) Field of Search ..................... 303/119.3, 113.1, 303/119.2, 119.1, DIG. 10, 116.4; 137/884, 137/596.17; 439/34

(56) References Cited

U.S. PATENT DOCUMENTS 5,466,055 A * 11/1995 Schmitt et al. .......... 303/119.3
5,988,767 A * 11/1999 Inoue et al. ............. 303/113.1
6,132,011 A * 10/2000 Iwamura et al. ......... 303/116.4

OTHER PUBLICATIONS

"Toyota Landcruiser® 100 Repair Manual," Service Department, *Toyota Motor Corporation*, BR-2, BR-53, BR-54, BR-55, Jan. 19, 1998.

* cited by examiner

*Primary Examiner*—Douglas C. Butler
(74) *Attorney, Agent, or Firm*—Buchanan Ingersoll PC

(57) ABSTRACT

A hydraulic brake device includes a master cylinder supplying pressurized fluid to plural brakes which respectively restrict the rotations of road wheels, a solenoid block mounted on the master cylinder and containing plural solenoid valves, and an ECU provided with a control board for controlling the solenoid valves to distribute pressurized fluid to the plural brakes and also provided with a case for containing the control board therein. The solenoid block and the ECU form an integrated structure, and the integrated structure composed of the solenoid block and the ECU is removably mounted on the master cylinder. Further, the ECU is secured to the solenoid block by screw bolts which are arranged within an area inside the external form of the control board. Thus, it becomes unnecessary to provide bolt seats for the screw bolt outside the case.

5 Claims, 9 Drawing Sheets

US 6,969,128 B2

HYDRAULIC BRAKE DEVICE

INCORPORATION BY REFERENCE

This application is based on and claims priority under 35 U.S.C. sctn. 119 with respect to Japanese Applications No. 2002-314536 filed on Oct. 29, 2002 and No.2003-305841 filed on Aug. 29, 2003, the entire contents of which are incorporated herein by reference.

BACKGROUND OF THE INVENTION

1. Field of the Invention

The present invention relates to a hydraulic brake device for use in restricting the rotations of wheels such as, preferably, road wheels for motor vehicles.

2. Discussion of the Related Art

Heretofore, there has been known a hydraulic brake device shown in FIGS. 9 to 12. The known device is composed of plural brakes BK (one only shown for brevity) for respectively restricting the rotations of road wheels WL, a master cylinder 2 for supplying pressurized fluid to the brakes BK when a brake pedal 1 is stepped on, an accumulator 3 for supplying high pressure brake fluid to assist the master cylinder 2 in generating the pressurized fluid, a reservoir tank 4 storing the brake fluid supplied to the master cylinder 2 and the accumulator 3, a pump unit 5 for feeding pressurized fluid to the accumulator 3, a solenoid block 6 provided with plural solenoid valves 6a therein which distribute the pressurized fluid to the brakes BK, and an ECU (Electronic Control Unit) provided with a control board 7a for controlling the open/shut operations of the solenoid valves 6a to distribute the pressurized fluid to the brakes BK and a case 7b for containing the control board 7a therein. (Reference: "Toyota Landcruiser® 100 Repair Manual", Service Dept., Toyota Motor Corporation, Jan. 19, 1998, BR-2, BR-53, BR-54, BR-55) As shown in FIGS. 11 and 12, the solenoid block 6 is bodily mounted on a mounting portion 2a formed on the master cylinder 2, and the case 7b is secured to the solenoid block 6 by means of screw bolts 8 from the outside of the case 7b.

Another hydraulic brake device of the type shown in FIG. 13 has also been known. This known device is composed of a master cylinder 12 of the vacuum booster type for supplying pressurized fluid to brakes BK which respectively restrict the rotations of road wheels WL when a brake pedal 11 is stepped on, a block 14 incorporating a hydraulic pump 14a therein which is driven by an electric motor 13 for generating pressurized fluid supplied to the brakes BK independently of the master cylinder 12 and also incorporating plural solenoid valves 14b which respectively distribute the pressurized fluid to the brakes BK, and an ECU 15 provided with a control board 15a for controlling the open/shut operations of the solenoid valves 14b to distribute the pressurized fluid to the brakes BK and also provided with a case 15b for containing the control board 15a therein. The block 14 is composed of the pump section and the solenoid section which are integrated as one body, and the case 15b is secured to the block 14 by means of screw bolts 16 which are inserted into the block 14 from the outside of the case 15b.

In the known device mentioned earlier, when the control board 7a was to be replaced with another, the control board 7a was separated from the solenoid block 6 by loosening the screw bolts 8. To this end, the screw bolts a had to be arranged at the exterior portions of the case 7b, in which arrangement the space for the case 7b was not used effectively as being uselessly consumed by those spaces which were retained at the exterior portions of the case 7b for the screw bolts. Further, if it was tried to secure a sufficient space within the case 7b, it naturally resulted that the case 7b and the solenoid block 6 had to be made large. Moreover, in the replacement of the control board 7a, electronic parts fixedly arranged in the solenoid block 6 were electrically disjoined from the control board 7a and again joined with a new one as replacement parts. This resulted in deteriorating the reliability in that the durability of the joining parts was decreased and that the conformity of the electronic parts with the control board 7a got worse.

Also in the known device mentioned in the latter half, when the control board 15a was to be replaced with another, the control board 15a was separated from the block 14 by loosening the screw bolts 16. Thus, the same drawbacks were brought about. That is, the screw bolts 16 had to be arranged at the exterior portions of the case 15b, in which arrangement the space for the case 15b was not used effectively as being uselessly consumed by those spaces which were retained at the exterior portions of the case 15b for the screw bolts 16. Further, if it was tried to secure a sufficient space within the case 15b, it naturally resulted that the case 15b and the solenoid block 14 had to be made large. Moreover, in the replacement of the control board 15a, electrical disjoining and rejoining were required to be done between electronic parts fixedly arranged in the block 14 and the control board 15a. This resulted in deteriorating the reliability in that the durability of the joining parts was decreased and that the conformity of the electronic parts with the control board 15a got worse,

SUMMARY OF THE INVENTION

Accordingly, it is a primary object of the present invention to provide an improved hydraulic brake device capable of preventing a case containing an ECU therein from being enlarged for easier replacement of the ECU.

Another object of the present invention is to provide an improved hydraulic brake device capable of ridding an ECU of being deteriorated in reliability due to the replacement of a control board of the ECU.

Briefly, in a hydraulic brake device according to the present invention, a pressurized fluid generator is provided for generating pressurized fluid supplied to plural brakes which respectively restrict the rotations of road wheels, and a solenoid block with plural solenoid valves incorporated therein is mounted on the pressurized fluid generator. An ECU is provided with a control board for controlling the solenoid valves to distribute pressurized fluid to the plural brakes. The ECU is also provided with a case, and the control board is contained in the case. The solenoid block and the ECU are constructed to be an integrated structure, and the integrated structure composed of the solenoid block and the ECU is removably mounted on the pressurized fluid generator.

With this configuration, since the solenoid block and the ECU are constructed to be an integrated structure and since the integrated structure composed of the solenoid block and the ECU is removably mounted on the pressurized fluid generator, the replacement of the control board can be done by replacing the integrated structure with another integrated structure as replacement parts. Therefore, it becomes unnecessary that for the replacement of the control board, electronic components or parts fixedly provided on the solenoid block are electrically disjoined from the control board and then, are electrically rejoined with a new control board. As a result, a highly reliable hydraulic brake device can be obtained which neither invites the deterioration in the durability at the joining portions nor invites the decrease in the conformity of the electronic parts with the control board.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

A hydraulic brake device in the first embodiment according to the present invention will be described hereinafter with reference to the accompanying drawings.

Figure 1:
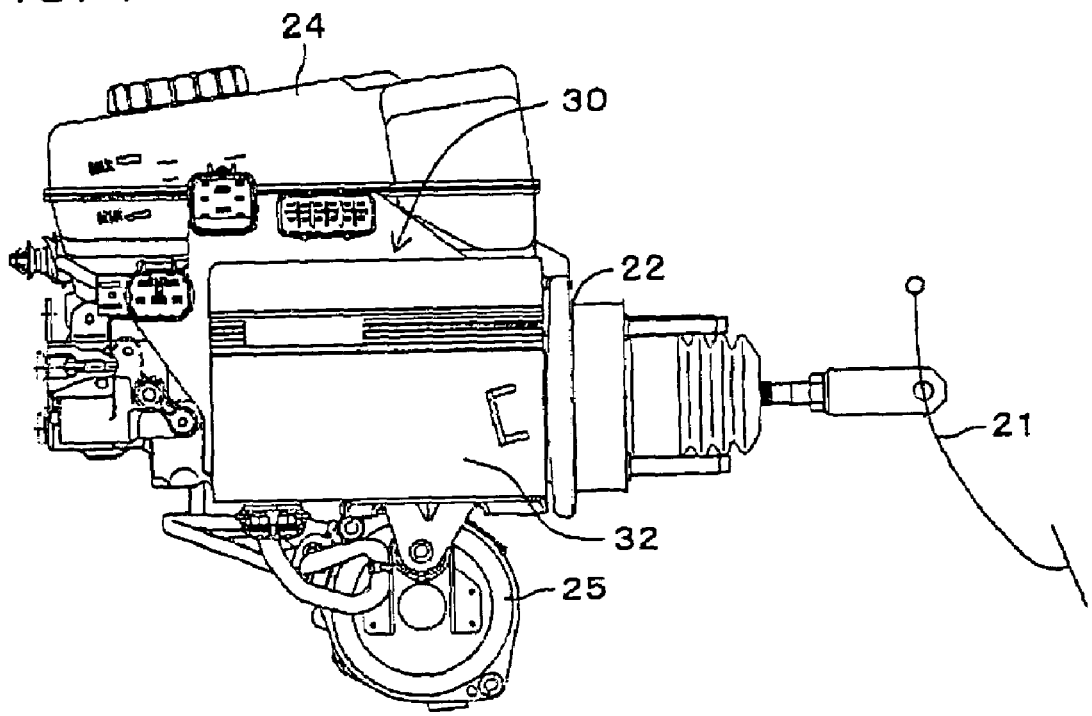
FIG. 1 is a side view of a hydraulic brake device in the first embodiment according to the present invention.
Figure 2:
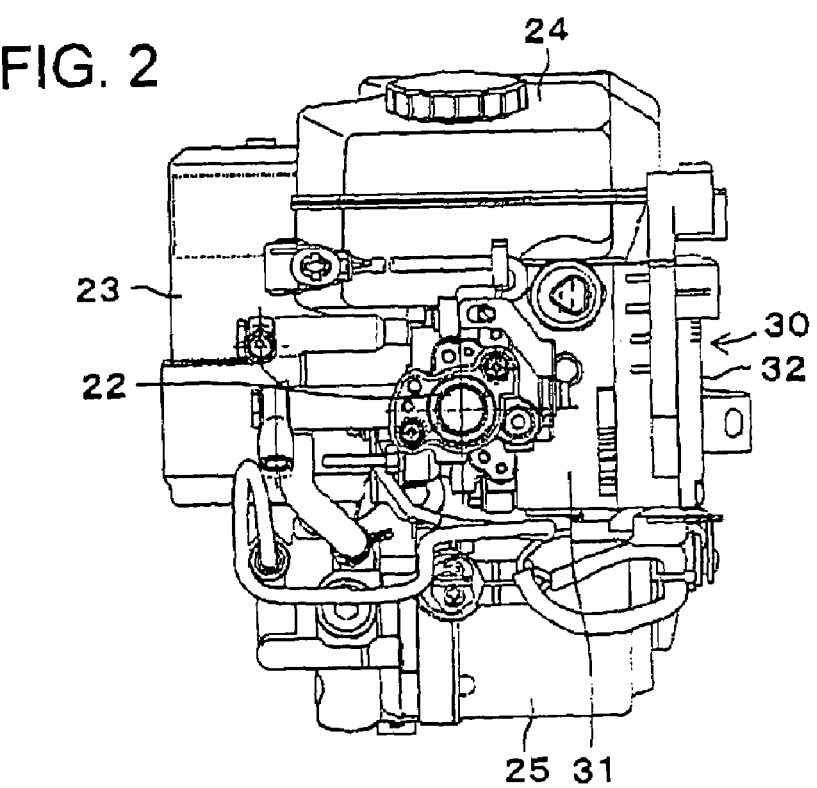
FIG. 2 is a front view of the hydraulic brake device in the first embodiment shown in FIG. 1.
Figure 3:
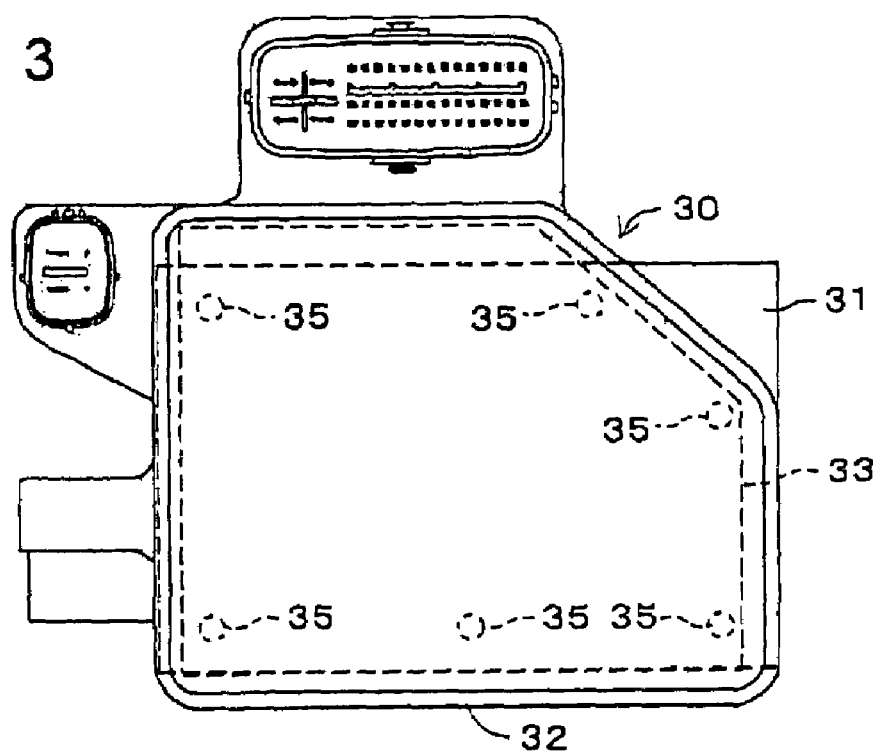
FIG. 3 is a side view of an integrated structure composed of a solenoid block and an ECU which are constructed as one body.
Figure 4:
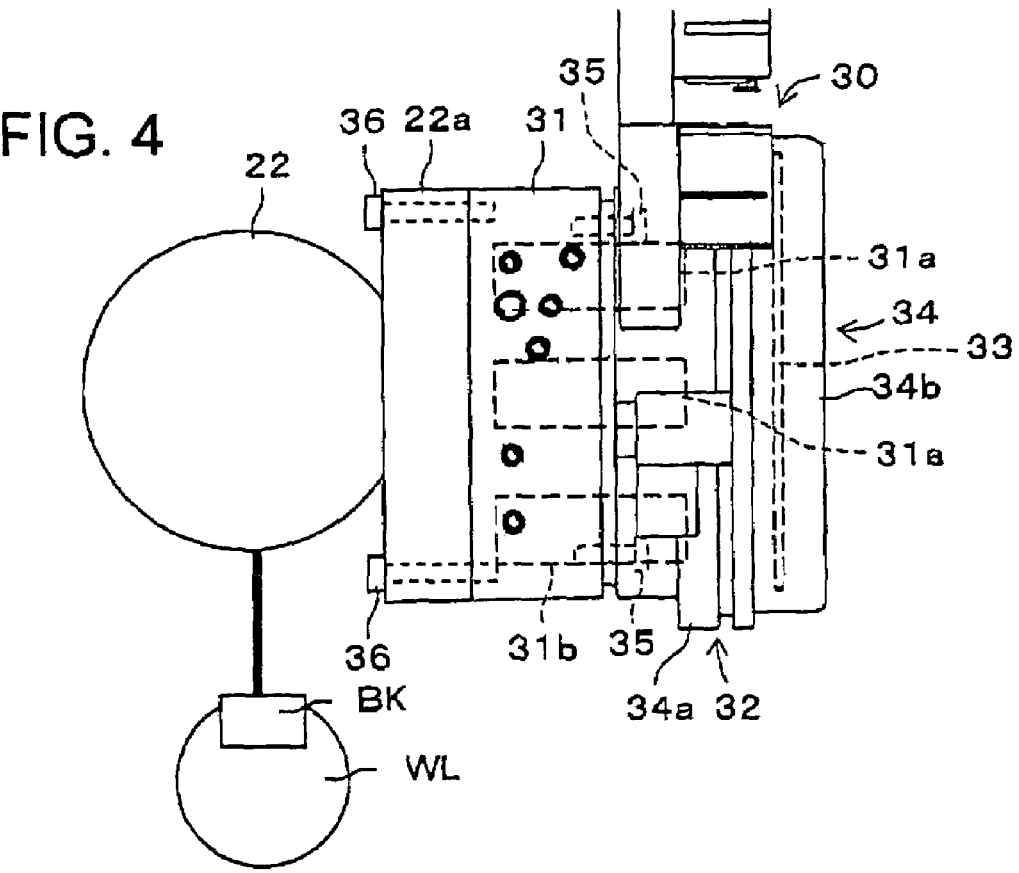
FIG. 4 is a front view of the integrated structure shown in FIG. 3.

FIGS. 1 and 2 respectively show a side view and a front view of the general construction of the hydraulic brake device in this first embodiment, and FIGS. 3 and 4 respectively show a side view and a front view of an integrated structure 30 composed of a solenoid block 31 and an ECU (Electronic Control Unit) 32 which are integrated as one body.

As shown in FIGS. 1 and 4, the hydraulic brake device is provided with a master cylinder 22 constituting a pressurized fluid generator for supplying pressurized fluid to plural brakes (one only shown for simplicity) BK which respectively restrict the rotations of road wheels WL when a brake pedal 21 is stepped on, an accumulator 23 for supplying high pressure brake fluid to augment th pressurized fluid from the master cylinder 22, a reservoir tank 24 for storing brake fluid supplied to the master cylinder 22 and the accumulator 23, a pump unit 25 for pressurizing and feeding brake fluid to the accumulator 23, and the integrated structure 30 mounted on the master cylinder 22. The accumulator 23 and the pump unit 25 constitute a hydraulic booster which works as the pressurized fluid generator. FIGS. 4, 6, 7, 8, 12 and 13 schematically illustrate road wheels WL and brakes BK (both one only shown) for simplicity.

Referring to FIGS. 1 to 4, the integrated structure 30 is shown being composed of the solenoid block 31 and the ECU 32 which are secured to each other. The integrated structure 30 is removably mounted on a mounting portion 22a provided on the master cylinder 22. Within the solenoid block 31, there are formed oil passages for supplying brake fluid supplied from the master cylinder 22 or the accumulator 23, to the respective brakes BK for the road wheels WL or the reservoir tank 24. Plural solenoid valves 31a for distributing pressurized fluid to the plural brakes BK and plural pressure sensors 31b for detecting the pressures on the oil passages to the respective brakes BK. The plural brakes BK and plural pressure sensors 31b are made to plural pairs which are respectively arranged on the oil passages to the plural brakes BK.

As shown in FIGS. 3 and 4, the ECU 32 is provided with a control board 33 for controlling the open/shut operations of the solenoid valves 31a thereby to distribute pressurized fluid to the respective brakes BK. The ECU 32 is also provided with a chassis or case 34 for incorporating or containing the control board 33 therein. The case 34 is composed of left and right cases 34a, 34b, and the left case 34a is secured to the solenoid block 31 by means of plural screw bolts 35 screwed thereinto, while the right case 34b is adhered by a suitable bonding agent to the left case 34a to cover the right end opening of the same fluid-tightly. The control board 33 is arranged within a space which the both cases 34a and 34b define therein. Thus, since the screw bolts 35 are located between the control board 33 and the left case 34a as viewed from the front side shown in FIG. 4, it becomes possible to arrange the screw bolts 35 within an area inside the external form of the control board 33, as viewed from the side shown in FIG. 3. That is, the ECU 32 is secured to the solenoid block 31 by means of the screw bolts 35 which are arranged within the area inside the external form of, or that occupied by, the control board 33, as clearly viewed in FIGS. 3 and 4. In this particular embodiment, the control board 33 is to be treated not to be separated from the case 34.

With the construction mentioned above, because the screw bolts 35 which are arranged within the area inside the external form of the control board 33 contained or built in the case 34 are used to secure the ECU 32 to the solenoid block 31, it is unnecessary to provide bolt seats for the screw bolts at the outside or exterior of the case 34 integrally with the same. This advantageously makes the external form of the case 34 small, so that the ECU 32 can successfully be miniaturized.

Figure 11:
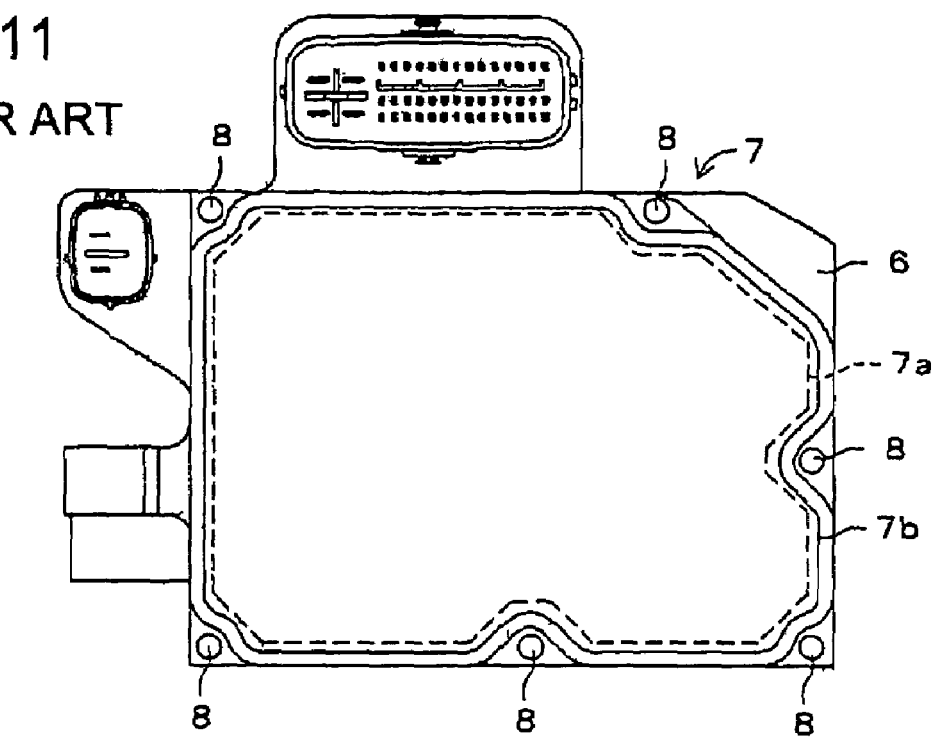
FIG. 11 is a side view of the structure wherein an ECU is mounted on a solenoid block in the known device shown in FIG. 10.
Figure 12:
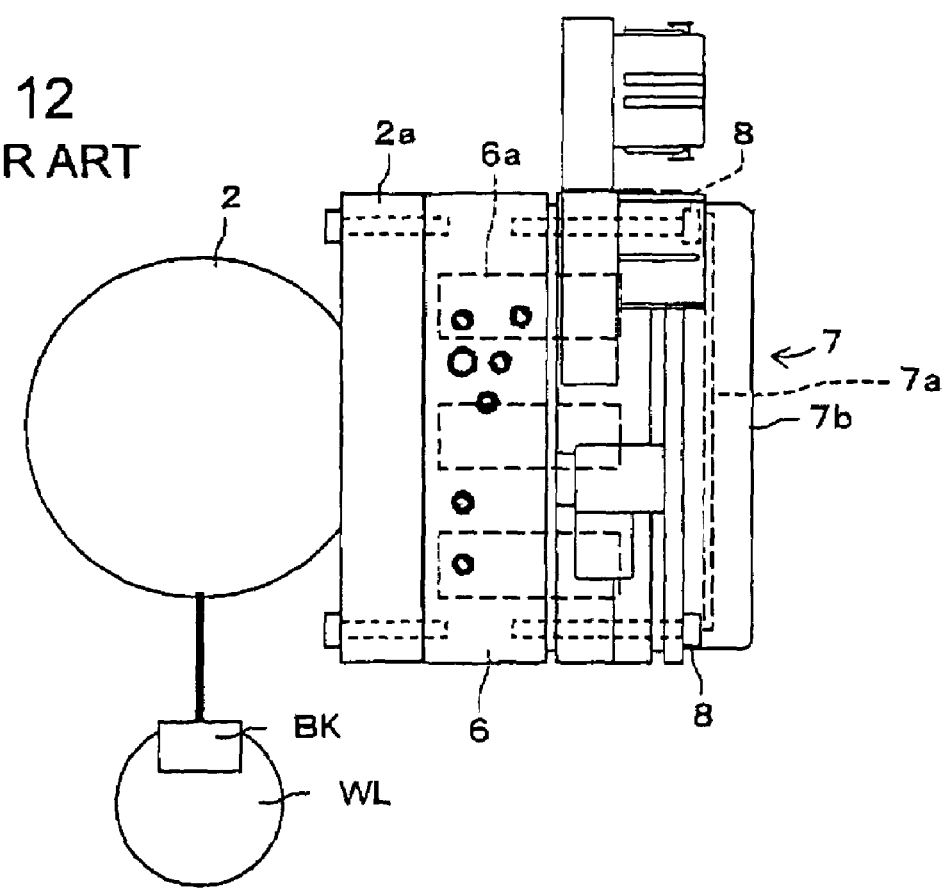
FIG. 12 is a front view of the structure shown in FIG. 11.
Figure 13:
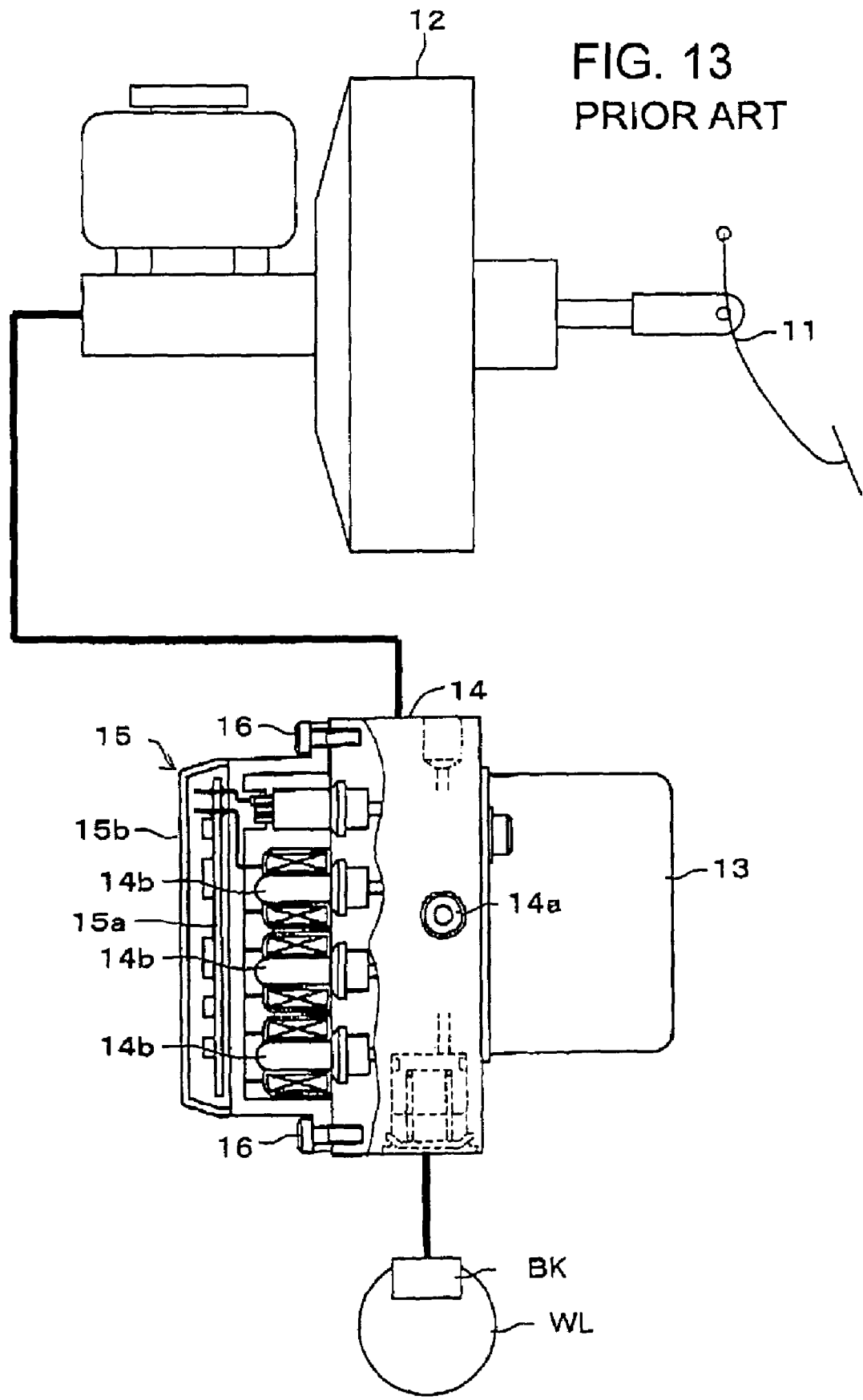
FIG. 13 is a side view of another hydraulic brake device also known as prior art.

In the structure of the prior art device shown in FIGS. 11 and 12 wherein the case 7b was secured to the solenoid block 6 by means of the screw bolts 8 which are located outside the external form of the control board 7a, the solenoid block 6 into which the screw bolts 9 are screwed had to be provided with bolt seats at which the screw bolts 8 are screwed and hence, had to be larger by the bolt seats than the external form of the control board 7a. In comparison to the aforementioned arrangement in the prior art, the case 34 in the first embodiment according to the present invention is not required to be provided with such bolt seats, as shown in FIGS. 3 and 4. Therefore, not only the case 34 but also the solenoid block 31 into which the screw bolts 35 are screwed can be remained to be smaller than those in the prior art device.

Additionally, in the securing method practiced in the prior art device, as the control board 7a is made larger, the solenoid block 6 has to be made larger in due course. Contrary to this, according to the present invention, even when the control board 33 is made larger, the solenoid block 31 can be remained as it is small, without being made larger, so that it can be realized to provide a smaller and lighter brake device.

Figure 5:
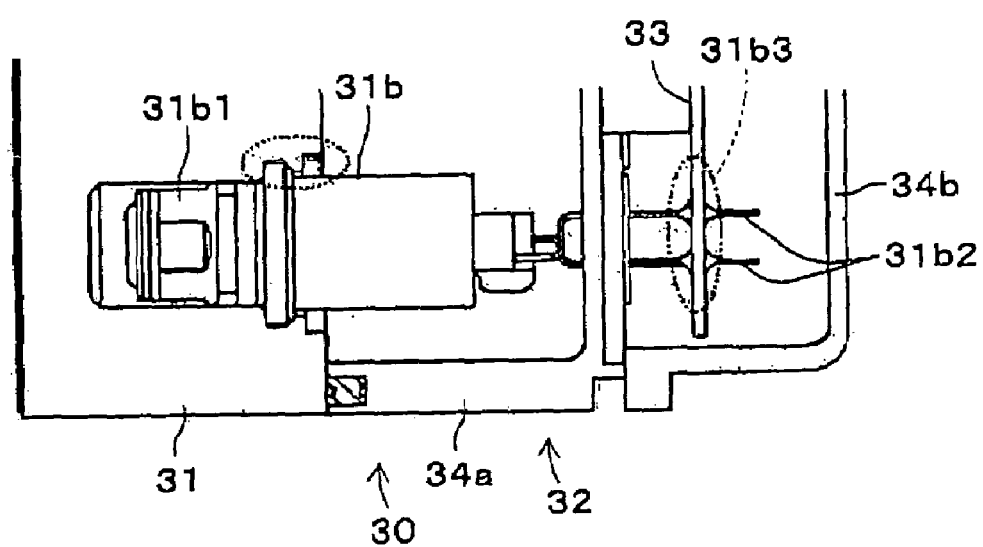
FIG. 5 is an enlarged fragmentary view showing the state of connection between the solenoid block and the ECU.

Further, as bet shown in FIG. 5, each of the pressure sensors 31b is secured by caulking to the solenoid block 31 with a sensing head 31b1 thereof being inserted into a corresponding one of the oil passages formed in the solenoid block 31, and a pair of output terminals 31b2 pass through the left case 34a and the control board 33 to be soldered to the control board 33. Thus, each pressure sensor 31b and the control board 33 can reliably be joined at a joining portion 31b3, so that an enhanced reliability can be obtained in supporting the control board 33.

As show in FIG. 4, the aforementioned integrated structure 30 is removably mounted on a mounting portion 22a of the master cylinder 22 in such a way as to be secured thereto by means of plural screw bolts 36 which pass through the mounting portion 22a.

As easily understood from the foregoing description, in the first embodiment, for replacement of the control board 33 with another, the integrated structure 30 composed of the solenoid block 31 and the ECU 32 is removed from the master cylinder 22, and then, a new integrated structure incorporating another or new control board therein is mounted on the master cylinder 22. By doing so, the control board 33 can be replaced with a new one without separating the ECU 32 from the solenoid block 31, and the electrical disjoining and rejoining are no longer needed to be done between the electronic parts or components such as the pressure sensors 31b and the control board 33. Consequently, it can be ensured to provide a highly reliable hydraulic brake device which neither invites deteriorating the durability at each joining portion 31b3 nor invites decreasing the conformity of the electronic parts with the control board 33.

Further, because the ECU 32 is secured to the solenoid block 31 by means of the screw bolts 35 which are arranged within the area inside the external form of the control board 33 built in the case 34, bolt seats for the screw bolts 35 do not have to be provided outside the case 34. Therefore, the case 34 can be made smaller, and hence, the ECU 32 can be miniaturized.

Furthermore, since it becomes unnecessary to provide the bolt seats on the solenoid block 31 into which the screw bolts 35 are screwed, the solenoid block 31 can take a smaller shape than that in the prior art device does. Accordingly, even where the control board 33 is made lager, the solenoid block 31 can be remained as it is small without being made larger, so that a smaller and lighter hydraulic brake device can be provided successfully.

In addition, because the integrated structure 30 is secured to the master cylinder 22 by means of the screw bolts 36 passing through the mounting portion 22a, it is unnecessary to provide such bolt seats at the outside or exterior of the case 34 or the solenoid block 31. Therefore, the case 34 and the solenoid block 31 can be made small in the external forms thereof, so that the ECU 32 can advantageously be miniaturized.

Although in the aforementioned first embodiment, the integrated structure 30 is mounted on the master cylinder 22, it may otherwise be mounted on any of other parts such as, for example, the pump unit 25 which are mounted on the master cylinder 22. In this manner, the integrated structure 30 may be mounted removably and indirectly on the master cylinder 22.

(Second Embodiment)

Figure 6:
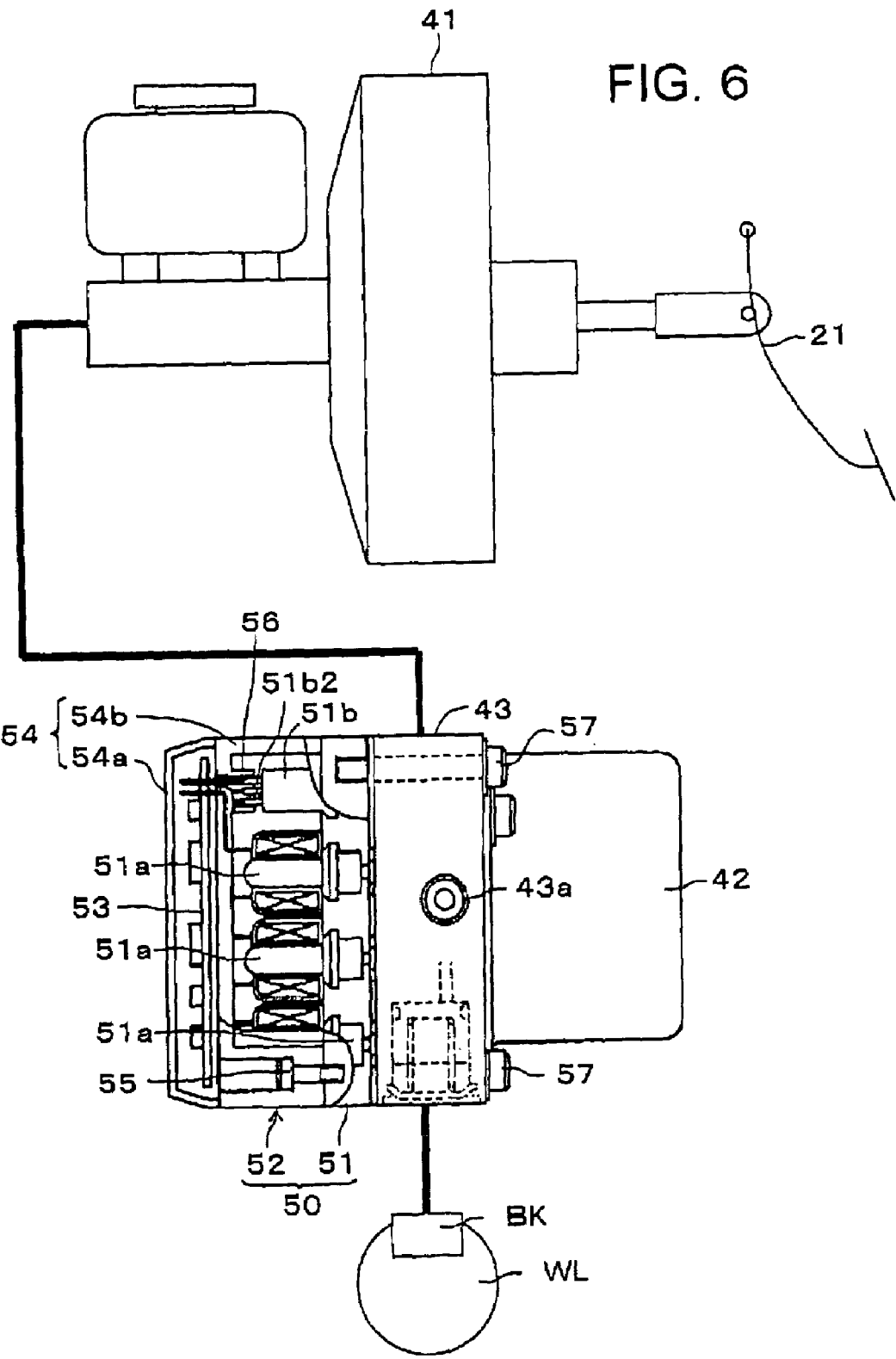
FIG. 6 is a general view showing a hydraulic brake device in the second embodiment according to the present invention.

Next, a hydraulic brake device in the second embodiment according to the present invention will be described with reference to FIG. 6. The hydraulic brake device in the second embodiment is provided with a master cylinder 41 of the vacuum booster type for generating pressurized fluid to be supplied to plural brakes BK which respectively restrict the rotations of road wheels WL when a brake pedal 21 is stepped on, and a hydraulic pump 43a driven by an electric motor 42 which works as pressurized fluid generator for generating pressurized fluid supplied to respective brakes BK independently of the master cylinder 41. The brake device is further provided with an integrated structure 50 mounted on a pump block 43 incorporating the hydraulic pump 43a therein.

The integrated structure 50 is composed of a solenoid block 51 and an ECU 52 connected with each other and is removably mounted on the pump block 43. Within the solenoid block 51, there are formed oil passages for supplying brake fluid supplied from the master cylinder 41 or the hydraulic pump 43a, to the respective brakes BK for the road wheels WL or the reservoir tank. The solenoid block 51 incorporates therein plural solenoid valves 51a for distributing pressurized fluid to the respective brakes BK and plural pressure sensors 51b for detecting the pressures on the passages to the respective brakes BK. The plural solenoid valves 51a and the plural pressure sensors 51b make plural pairs, which are respectively arranged on the oil passages to the respective brakes BK.

The ECU 52 is provided with a control board 53 for controlling the open/shut operations of the solenoid valves 51a thereby to distribute pressurized fluid to the respective brakes BK and is further provided with a chassis or case 54 containing the control board 53 therein. The case 54 is composed of left and right cases 54a, 54b, and the right case 54b is secured to the solenoid block 51 by means of plural screw bolts 55 screwed into the right case 54b, while the left case 54a is adhered by a suitable bonding agent to the right case 54b to cover the left end opening of the same fluid-tightly. The control board 53 is arranged within a space which the both cases 54a and 54b define therein. Thus, the screw bolts 55 are located between the control board 53 and the right case 54b within an area inside the external form of the control board 53. That is, the ECU 52 is secured to the solenoid blocks 51 by means of the screw bolts 55 which are located within the area inside the external form of the control board 53, as clearly viewed in FIG. 6.

Further, in the same manner as described in the first embodiment, each of the pressure sensors 51b is secured by caulking to the solenoid block 51 with a sensing head (not shown) being inserted into a corresponding one of the oil passages, and a pair of output terminals 51b2 are tightly secured by being fit in an associated socket 56 which is soldered to the control board 53. Thus, each pressure sensor 51b and the control board 53 can be reliably joined, so that an enhanced reliability can be obtained in light of electrical connection. Further, the aforementioned integrated structure 50 is removably mounted on the pump block 43 in such a way as to be secured thereto by means of plural screw bolts 57 passing through the pump block 43.

As easily understood from the foregoing description, in this particular second embodiment, for replacement of the control board 53 with another, the integrated structure 50 composed of the solenoid block 51 and the ECU 52 is removed from the pump block 43, and instead, a new integrated structure 50 is mounted on the pump block 43. Also with this configuration, there can be attained the same functions and the same effects as those attained in the first embodiment.

(Third Embodiment)

Figure 7:
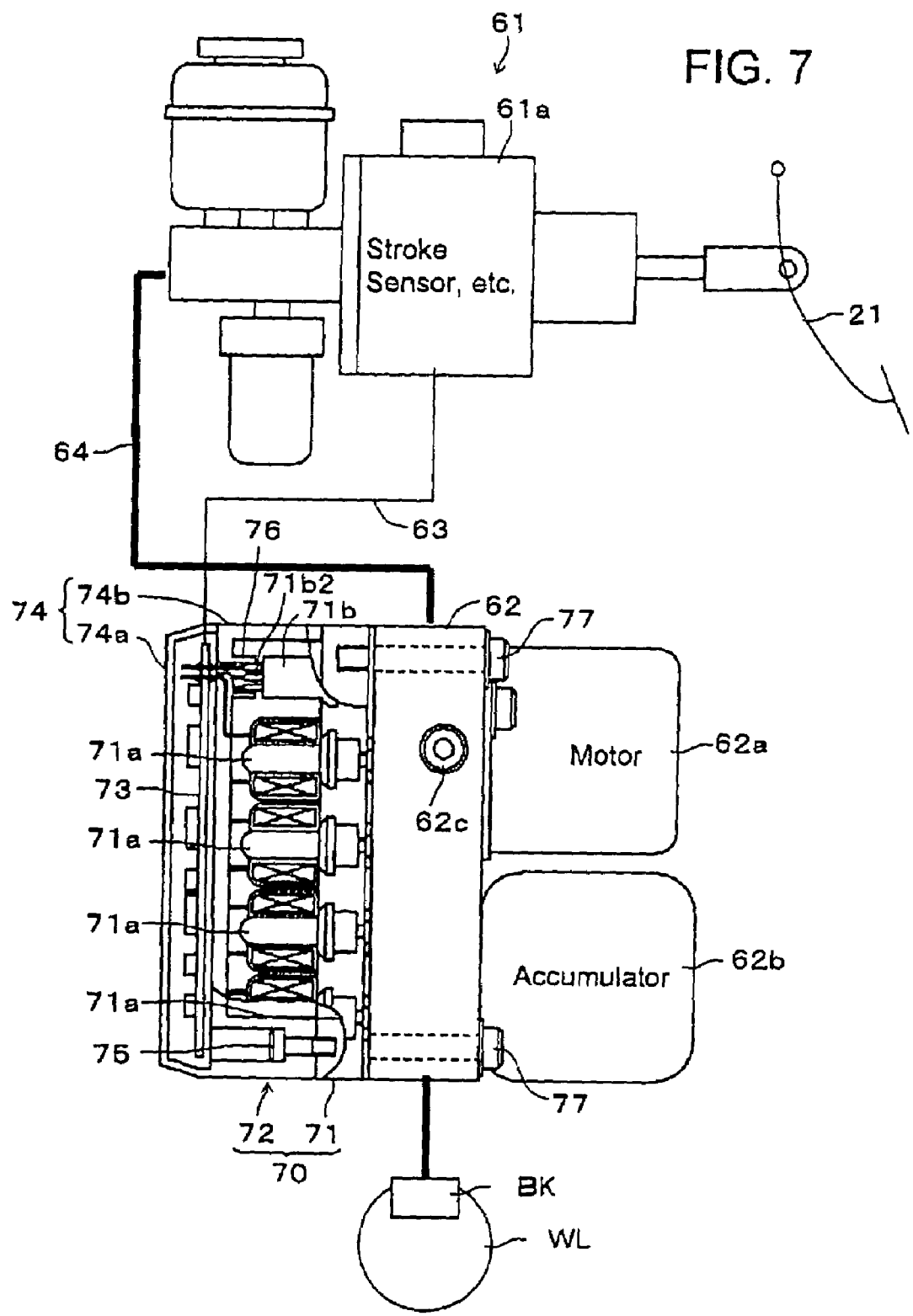
FIG. 7 is a general view showing a hydraulic brake device in the third embodiment according to the present invention.

Next, a hydraulic brake device in the third embodiment according to the present invention will be described with reference to FIG. 7. The hydraulic brake device in the third embodiment is provided with a master cylinder 61 for generating pressurized fluid supplied to plural brakes BK which respectively restrict the rotations of road wheels WL, in dependence on a brake manipulation force applied to a brake pedal 21, a hydraulic pump 62c driven by an electric motor 62a in dependence on the applied brake manipulation force for generating pressurized fluid supplied to respective brakes BK independently of the master cylinder 61, and an integrated structure 70 mounted on a pump block 62 incorporating the hydraulic pump 62c therein. The hydraulic pump 62c works as pressurized fluid generator which is provided separated from the master cylinder 61. The pump block 62 is provided with an accumulator 62b for storing the brake fluid that the pump 62c pressurizes when driven by the electric motor 62a.

The hydraulic pump 62c is operated in an ordinary state. That is, when the brake pedal 21 is stepped on, the control board 73 receives via a signal line 63 signals indicative of the step-on amount and step-on speed of the brake pedal 21 which are detected by a group of sensors 61a including a stroke sensor for the master cylinder 61, calculates the applied brake manipulation force based on the step-on amount and step-on speed of the brake pedal 21, and controls the electric motor 62a so that the hydraulic pump 62c is able to supply brake fluid of the pressure depending on the applied brake manipulation force to the brake pedal 21. In the ordinary state, the master cylinder 61 is not in fluid communication with respective brakes BK for the road wheels WL, whereby the pressurized fluid generated by the master cylinder 61 is not supplied to any of the brakes BK.

However, when pressurizing the brake fluid cannot be done as the ordinarily state due to the failure of the hydraulic pump 62c or the like, the master cylinder 61 operates as fail safe measures and supplies the pressurized fluid to the brakes BK through a conduit 64. In such a event, the control board 73 detects the failure of the hydraulic pump 62c or the like and brings the master cylinder 61 into the fluid communication with the respective brakes BK. This can be done by using conventional suitable measures for detecting the faults of operation devices and conventional suitable measures for selectively establishing the communication between the hydraulic devices.

The integrated structure 70 is composed of a solenoid block 71 and an ECU 72 and is removably mounted on the pump block 62. Plural solenoid valves 71a and plural pressure sensors 71b each for detecting fluid pressure are built or incorporated in the solenoid block 71, in the same manner as the integrated structure 50 in the foregoing second embodiment. The ECU 72 is composed of a control board 73 and a case 74 comprising left and right cases 74a, 74b. The right case 74b is secured to the solenoid block 71 by means of screw bolts 75. Further, each pair of output terminals of each pressure sensor 71b are tightly inserted into a socket 76. The aforementioned integrated structure 70 is removably mounted on the pump block 62 in such a way as to be secured thereto by means of plural screw bolts 77 passing through the pump block 62.

As easily understood from the foregoing description, in this particular third embodiment, for replacement of the control board 73 with another, the integrated structure 70 composed of the solenoid block 71 and the ECU 72 is removed from the pump block 62 by loosening the screw bolts 77, and instead, a new integrated structure 70 is mounted on the pump block 62. Also with this configuration, there can be attained the same functions and the same effects as those attained in the first embodiment.

Figure 8:
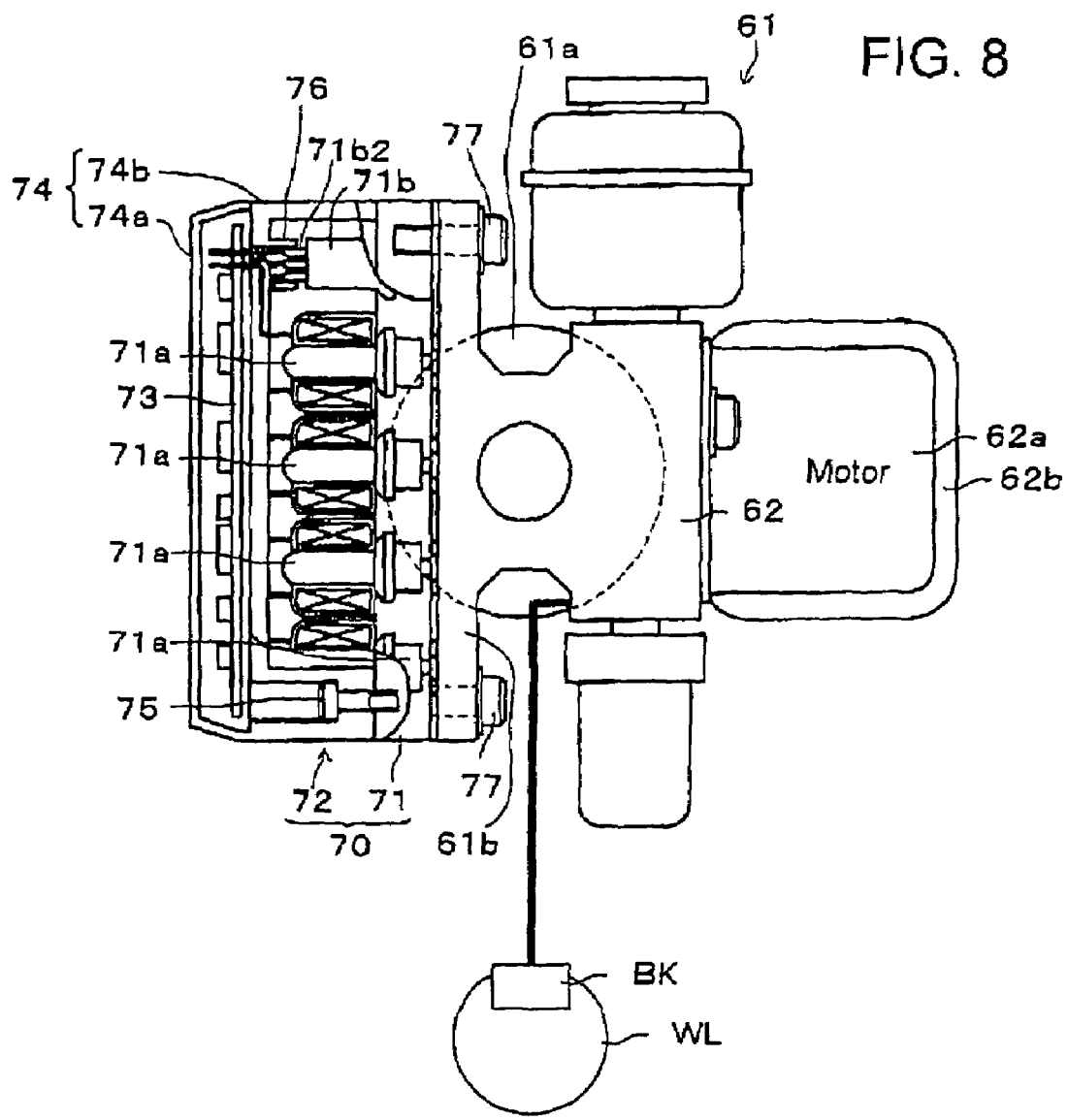
FIG. 8 is a general view showing a modified form of the hydraulic brake device in the third embodiment according to the present invention.
Figure 9:
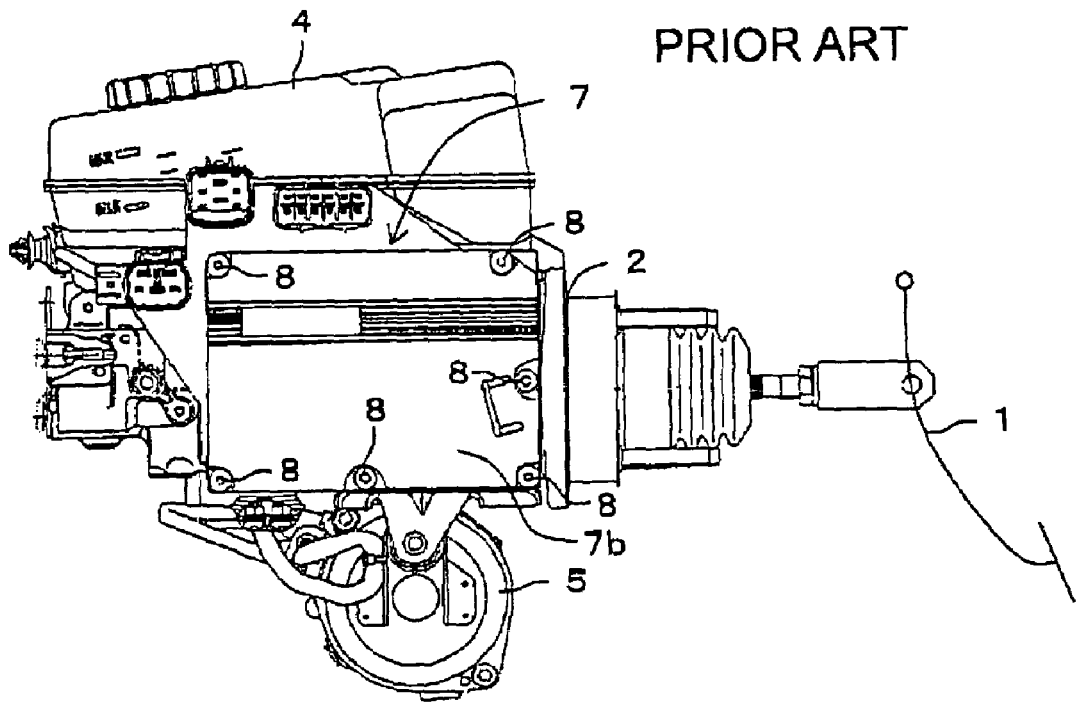
FIG. 9 is a side view of a hydraulic brake device known as prior art.
Figure 10:
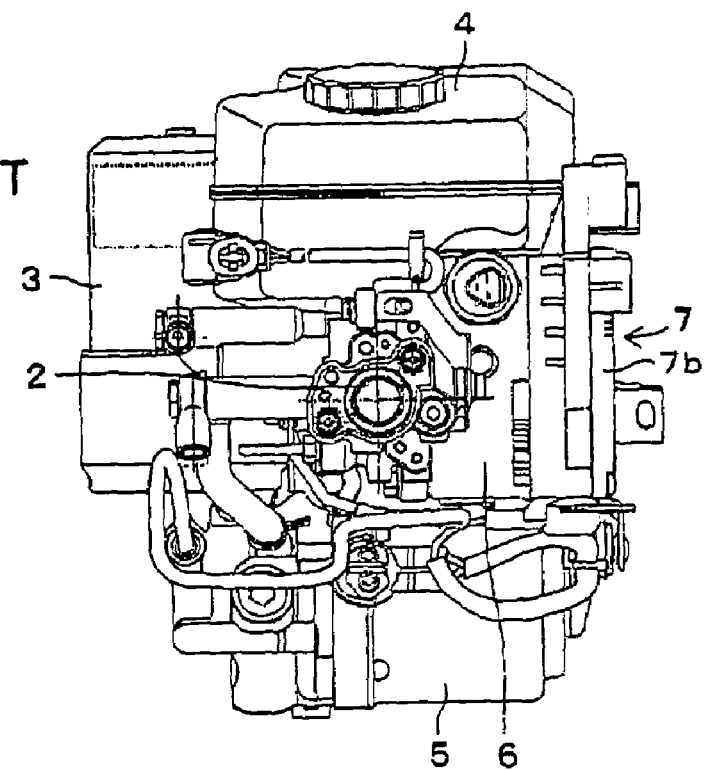
FIG. 10 is a front view of the known hydraulic brake device shown FIG. 9.

Although in the aforementioned third embodiment, the pump block 62 is provided separately from the master cylinder 61, the pump block 62 may otherwise be provided bodily with the master cylinder 61, as show in FIG. 8. In this modified form, the integrated structure 70 is removably mounted on a mounting portion 61b provided on the master cylinder 61 in such a way as to be secured thereto by means of screw bots 77 passing through the mounting portions 61b. Also with the configuration in this modified form, the same functions and the same effects as those in the third embodiment can be attained. FIG. 8 shows the master cylinder 61 as viewed from the left side in FIG. 7.

Finally, various features and the attendant advantages of the foregoing embodiments are summarized as follows:

In the embodiment as described with reference to FIGS. 1 to 4 for example, since the solenoid block 31 and the ECU 32 are constructed to be the integrated structure 30 and since the integrated structure 30 composed of the solenoid block 31 and the ECU 32 is removably mounted on the pressurized fluid generator which is constituted by, e.g., the master cylinder 22, the replacement of the control board 33 can be done by replacing the integrated structure 30 with another integrated structure as replacement parts. Therefore, it becomes unnecessary that electronic components or parts fixedly provided in the solenoid block 31 are electrically disjoined from the control board and again are rejoined with a new one for the replacement of the control board 33. As a result, a highly reliable hydraulic brake device can be obtained which neither invites the deterioration in the durability at the joining portions nor invites the decrease in the conformity of the electronic parts with the control board.

In the embodiment shown in FIG. 4 for example, the solenoid block 31 and the ECU 32 are constructed to be the integrated structure 30 and the integrated structure 30 composed of the solenoid block 31 and the ECU 32 is removably mounted on the master cylinder 22 or the fluid booster. In the embodiment shown in FIG. 6 for example, the solenoid block 51 and the ECU 52 are constructed to be the integrated structure 50, and the integrated structure 50 composed of the solenoid block 51 and the ECU 52 is removably mounted on the pump block 43. Also, in the embodiment shown in FIG. 8, the solenoid block 71 and the ECU 72 are constructed to be the integrated structure 70, and the integrated structure 70 composed of the solenoid block 71 and the ECU 72 is removably mounted on the master cylinder 61. According to these embodiments, the replacement of the control board 33, 53, 73 can be done by replacing the integrated structure 30, 50, 70 with another integrated structure as replacement parts. Therefore, it becomes unnecessary that electronic components or parts fixedly provided in the solenoid block 31, 51, 71 are electrically disjoined from the control board 33, 53, 73 and again rejoined with the replacement of the control board 33, 53, 73. As a result, a highly reliable hydraulic brake device can be obtained which neither invites the deterioration in the durability at the joining portions nor invites the decrease in the conformity of the electronic parts with the control board.

In the embodiment shown in FIGS. 3 and 4 for example, the ECU 32 is secured to the solenoid block 31 by means of the screw blots 35 which are arranged within the area inside the external form of the control board 33 contained in the case 34. Thus, it becomes unnecessary to provide bolt seats at the outside or exterior of the case 34, so that the external forms of the case 34 and the solenoid block 31 and hence, the ECU 32 can be miniaturized.

In the embodiment shown in FIG. 4 for example, the integrated structure 30 is secured to the master cylinder 22 by means of the screw bolts 36 which pass through the mounting portion 22a. Also in the embodiment shown in FIG. 6 for example, the integrated structure 50 is secured to the pump block 43 by means of the screw bolts 57 which pass through the pump block 43. Thus, according to these embodiments, it becomes unnecessary to provide bolt seats for the screw bolts 57 at the outside or exterior of the case, so that the external forms of the case 34, 54 and the solenoid block 31, 51 and hence, the ECU 32, 52 can be miniaturized.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic brake device having a pressurized fluid generator for generating pressurized fluid supplied to plural brakes which respectively restrict the rotations of road wheels, a solenoid block mounted on said pressurized fluid generator and containing plural solenoid valves therein, and an ECU provided with a control board for controlling said solenoid valves to distribute pressurized fluid to said plural brakes and also provided with a case for containing said control board therein; wherein:
   said solenoid block and said ECU are constructed to be an integrated structure in which said ECU is secured to said solenoid block by screw bolts arranged in an area inside an external form of said control board contained in said case; and
   said integrated structure composed of said solenoid block and said ECU is removably mounted on said pressurized fluid generator.

2. A hydraulic brake device having a master cylinder for generating pressurized fluid supplied to plural brakes which respectively restrict the rotations of road wheels, a fluid booster for assisting said master cylinder in generating said pressurized fluid, a solenoid block mounted on a mounting portion provided on said master cylinder and containing plural solenoid valves therein and an ECU provided with a control board for controlling said solenoid valves to distribute pressurized fluid to said plural brakes and also provided with a case for containing said control board therein; wherein:
   said solenoid block and said ECU are constructed to be an integrated structure in which said ECU is secured to said solenoid block by screw bolts arranged in an area inside an external form of said control board contained in said case; and
   said integrated structure composed of said solenoid block and said ECU is removably mounted on said master cylinder or said fluid booster.

3. A hydraulic brake device as set forth in claim 2, wherein: said integrated structure is secured to said master cylinder by means of screw bolts which pass through said mounting portion.

4. A hydraulic brake device having a master cylinder for generating a fluid pressure signal corresponding to a brake manipulation force, a hydraulic pump provided bodily with said master cylinder and driven by an electric motor in dependence on said fluid pressure signal indicative of said brake manipulation force for generating pressurized fluid supplied to plural brakes independently of said master cylinder, a solenoid block is mounted on a mounting portion provided on said master cylinder and provided with plural solenoid valves therein, and an ECU provided with a control board for controlling said solenoid valves to distribute pressurized fluid to said plural brakes and also provided with a case for containing said control board therein; wherein:
   said solenoid block and said ECU are constructed to be an integrated structure in which said ECU is secured to said solenoid block by screw bolts arranged in an area inside an external form of said control board contained in said case; and
   said integrated structure composed of said solenoid block and said ECU is removably mounted on said master cylinder.

5. A hydraulic brake device as set forth in claim 4, wherein: said integrated structure is secured to said master cylinder by means of screw bolt which pass through said mounting portion.

* * * * *